E. B. WILLIAMS.
REINFORCED CONCRETE FLOWER POT.
APPLICATION FILED OCT. 14, 1916.

1,224,820.

Patented May 1, 1917.

Witness
Edwin J. Beller.

Inventor
Eden B. Williams,
by Wilkinson, Giusta & MacKaye,
Attorneys.

UNITED STATES PATENT OFFICE.

EDEN B. WILLIAMS, OF CHAMBERLIN, LOUISIANA.

REINFORCED-CONCRETE FLOWER-POT.

1,224,820.  Specification of Letters Patent.  Patented May 1, 1917.

Application filed October 14, 1916. Serial No. 125,649.

*To all whom it may concern:*

Be it known that I, EDEN B. WILLIAMS, a citizen of the United States, residing at Chamberlin, in the parish of West Baton Rouge and State of Louisiana, have invented certain new and useful Improvements in Reinforced-Concrete Flower-Pots; and I do hereby declare the following to be a full, clear, and exact description of the invention, such as will enable others skilled in the art to which it appertains to make and use the same.

My invention relates to improvements in reinforced concrete flower pot, and it is intended to provide a cheap, efficient and artistic looking flower pot, which is comparatively light, and practically unbreakable incident to the ordinary use of such devices.

The ordinary earthenware pots of terra-cotta or other material, are more or less fragile, and when inadvertently knocked off a shelf or struck together are apt to break in pieces.

According to my invention I provide a pot having a practical heavy base and top rim with thin tapered frusto-conoidal walls forming the body portion of the pot, said walls and the top and bottom being reinforced with steel or iron wire.

Figure 1:
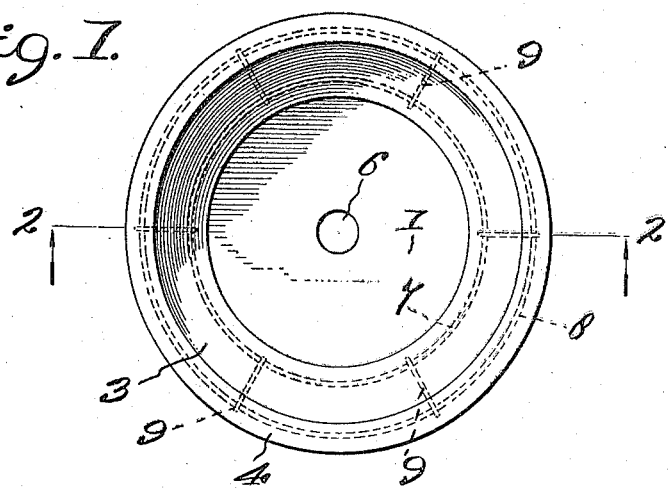
Figure 2:
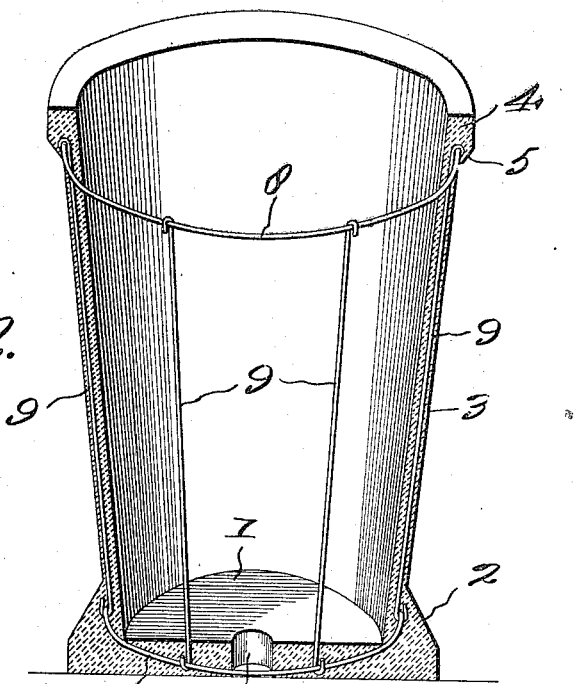

My invention will be more fully understood by reference to the accompanying drawings forming a part of this specification, in which, Figure 1 is a plan view of the complete flower pot; and Fig. 2 is a perspective view showing a section along the line 2—2 of Fig. 1, and looking in the direction of the arrows, but the fore part of the metal reinforce frame being shown in elevation.

1 represents the base of the pot and is partly tapered upward as at 2, until it joins the frusto-conoidal body portion of the pot 3, and this is curved outward as at 5, to form the top ring 4. The bottom disk is perforated as at 6 to permit the draining of water therethrough, and the bottom disk is flanged outward and made somewhat thicker than the other portions of the pot, so that it may form a suitable base, and the pot may be less liable to be accidentally over-turned.

Embedded in the bottom piece 1 of the pot is a wire ring 7, and in the top ring 4 is a wire ring 8, and these two wire rings are connected by rods 9 preferably made of iron or steel wire. The rings 7 and 8 and the rods 9 thus form a skeleton metal frame in the form of a skeleton frustum of a cone.

In manufacturing the device the frame is put in the mold, and the concrete is poured in and the pot is molded in the usual way.

I do not claim any invention in the special form of mold as any suitable form of mold can be used as may be required.

It will be seen that I provide an artistic and symmetrical flower pot that has a heavy supporting base, and is not likely to up-set, and is practically safe from breaking.

The parts may be obviously made of various sizes and the contour of the top ring or the base may be varied within certain limits; and other changes might be made which could be used without departing from the spirit of my invention.

Having thus described my invention what I claim and desire to secure by Letters Patent of the United States, is:

A reinforced concrete flower pot comprising a skeleton metallic frame comprising an upper and a lower ring with a series of rods connecting said upper and lower rings, and a hollow concrete body portion having a thickened annular head inclosing said upper ring and the joints between the rods and said ring, a comparatively thin body portion inclosing said rods connecting the two rings, and a flanged heavy bottom portion inclosing said lower ring and the joints between the ring and said rods and forming a weighted base to render the flower pot more stable, the said bottom portion being perforated to permit the draining of water therethrough, substantially as described.

In testimony whereof, I affix my signature.

EDEN B. WILLIAMS.

Copies of this patent may be obtained for five cents each, by addressing the "Commissioner of Patents, Washington, D. C."